Patented Apr. 21, 1942

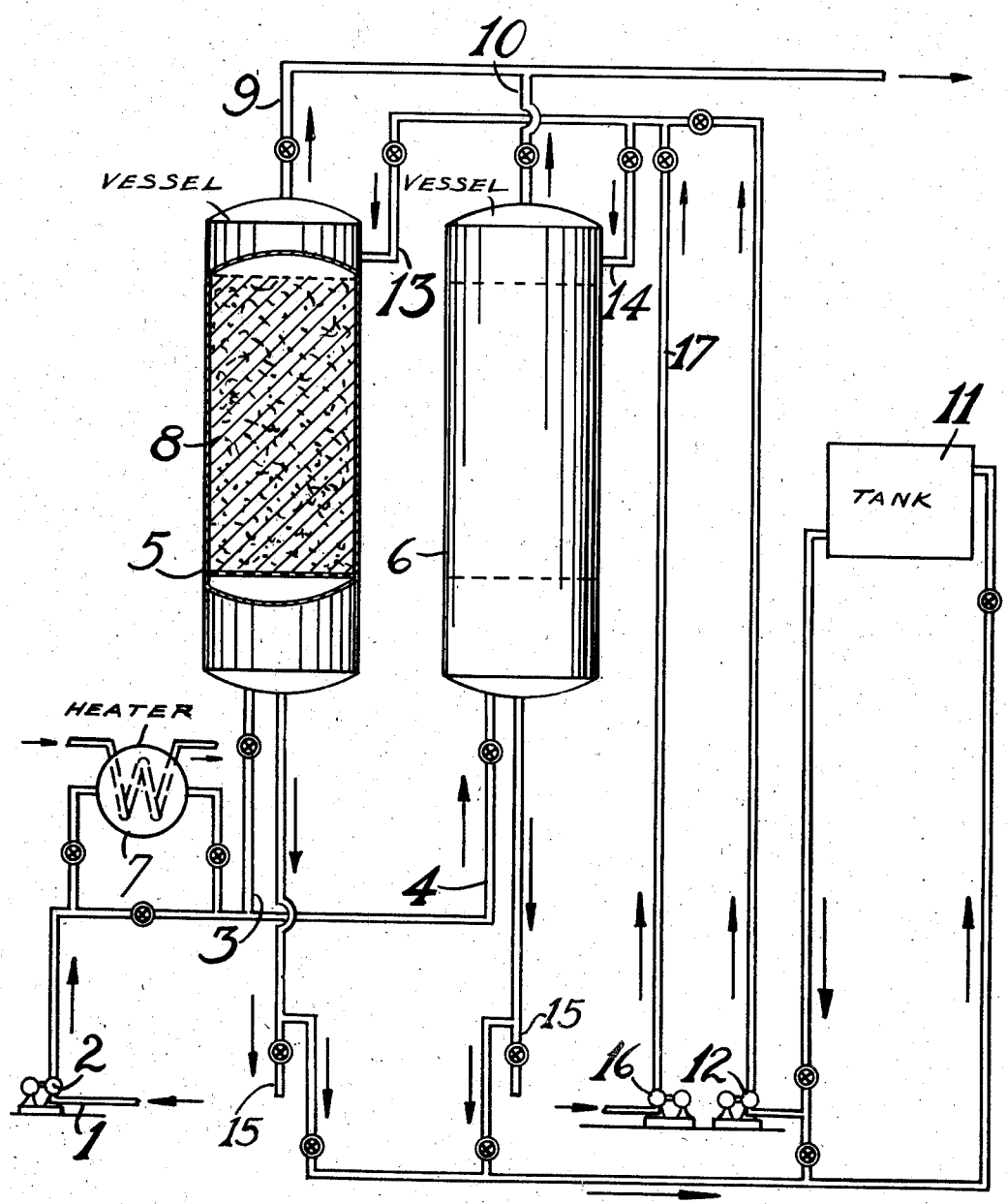

2,280,237

UNITED STATES PATENT OFFICE 2,280,237

REFINING PROCESS

Minor C. K. Jones, Elizabeth, N. J., assignor to Standard Oil Development Company, a corporation of Delaware Application August 12, 1939, Serial No. 289,804

8 Claims. (Cl. 196—44)

This invention relates to the treatment of mineral oils in order to remove salts present therein and thereby to lessen the corrosion of oil treating equipment used in refining and handling such oils. It relates more particularly to the use of solid base exchange substances for this purpose.

Severe corrosion of refinery equipment in both distilling and cracking installations has appeared in many refineries. This corrosion is particularly evident in the treatment of crudes of high chloride content. Such crudes contain chlorides which hydrolyze readily to form hydrogen chloride. Examples of these are the chlorides of the alkaline earth metals, especially calcium and magnesium. When crude oils containing such salts are heated in the presence of even minute traces of water, the salts hydrolyze to form hydrochloric acid which causes excessive corrosion of the oil treating equipment.

It has now been found that this corrosion can be greatly reduced by treating oils containing the highly corrosive salts, especially the chlorides of magnesium and calcium, with solid base-exchange substances, particularly the hydrated alkali aluminum silicates of the zeolite or "Permutit" type.

The drawing is a diagrammatic illustration in partial sectional elevation of suitable apparatus for carrying out the process of this invention, and indicates the flow of materials.

A crude petroleum containing inorganic salts, or a residual fraction of such an oil, is supplied from any suitable source by line 1 and is passed by pump 2 and line 3 or 4 into either of vessels 5 or 6. The oil may be heated in heater 7 to any desired temperature in order to decrease its viscosity, increase the ease of handling it, and shorten the time of treating, but is preferably not heated to a temperature above about 100° C. or to any temperature that will cause decomposition or objectionable dehydration of the treating agents in vessels 5 or 6. These vessels are packed with a suitable solid base-exchange substance 8, preferably in the form of solid lumps or granules of large surface area, such as a sodium zeolite. Other alkali zeolites, such as those of potassium and ammonium, may also be used, but are more expensive. The treated oil is withdrawn from the vessels 5 and 6 by the lines 9 and 10 respectively, and may be passed directly to suitable distillation or storage equipment (not shown). After a bed of the base-exchange substance 8 has been used in treating so much oil that its efficiency in removing hydrolyzable salts, such as magnesium chloride, from the oil is no longer satisfactory, the treater is drained of oil and the incoming oil is directed to another treater containing fresh or regenerated base-exchange treating substance, and the process continued as before. The previously used treater is then washed with an aqueous solution of an alkali halide, such as sodium chloride, to displace alkaline earth metals and to regenerate the original alkali zeolite. The sodium chloride solution is passed from tank 11 by pump 12 through lines 13 or 14 and through vessels 5 or 6, respectively. It may then be returned to the tank 11 or pump 12 for further use, or may be discarded to the drain 15. When a treater has been regenerated, the flow of sodium chloride solution is cut off and the treater is washed with water supplied by pump 16 and line 17, the wash water passing through the treater and to the drain 15, preferably until it is substantially free of chloride. Additional treating vessels may be connected in parallel in case equal treating and regenerative times are found unsuitable for the particular treating agents and oils being used.

It will be understood that the apparatus illustrated above and the process described in connection therewith are merely illustrative, and that many changes in methods of bringing the oil and treating agent into contact, in methods of draining oil and water from the treating vessel at the end of treating and regeneration periods, and in methods of regeneration of the treating agent, may be made without departing from this invention.

The amount of treating agent used will vary greatly with its efficiency and the salt content of the oil being treated. In general, oil is passed through a bed of the treating agent until its efficiency is no longer satisfactory and the treating agent is then regenerated. By way of example only, a twenty-ton charge of a sodium zeolite would be suitable for treating 5,000 barrels of a West Texas crude of 25 pounds per 1,000 barrels of hydrolyzable salt content, and if the oil is passed by gravity flow through a bed of the zeolite 5 feet deep and 10 feet in diameter, about 5 days will be required to treat this amount of oil. The zeolite may then be regenerated as described and used to treat additional oil, the regeneration and oil treating cycles being repeated as often as desired.

The following examples are presented to illustrate suitable methods for carrying out this invention. In these tests the oils used were analyzed to determine their content of hydrolyzable chlorides before and after each treatment. This analysis was conducted by distilling the oil with open steam in a direct fired still, heating the still to a maximum temperature of 750° F., and analyzing the total distillate for chloride content. In check analyses, oils containing only sodium chloride showed no hydrolyzable chloride in this analysis, while oils containing magnesium and calcium chlorides showed extensive hydrolysis. In each of the following examples the total hydrolyzable chloride found is calculated as magnesium chloride, since it is believed that this salt contributes most extensively to hydrogen chloride formation.

*Example I*

A West Texas crude petroleum oil containing 13.4 lbs. of hydrolyzable chlorides (calculated as magnesium chloride) per 1000 barrels was passed through a bed of active sodium zeolite which had been used repeatedly in the treatment of water to remove hardness, followed by regeneration with saturated aqueous sodium chloride solution. After this treatment, the oil contained 6.2 lbs. of hydrolyzable chloride per 1000 barrels, indicating a reduction of 54% in chloride content.

*Example II*

A West Texas crude oil containing 22.7 lbs. of hydrolyzable chlorides per 1000 barrels was passed through a bed of fresh sodium zeolite supplied by the Permutit Company under the trade name "De Calso." The treated oil contained 15.9 lbs. of hydrolyzable chloride per 1000 barrels, indicating a reduction of 30% in chloride content.

*Example III*

Another portion of the same crude oil used in Example II was passed through a bed of fresh sodium zeolite supplied by the Permutit Company under the trade name "Super Zeo Dur." The treated oil contained 18.7 lbs. of hydrolyzable chloride per 1000 barrels, indicating a reduction of 17.5% in chloride content.

The oil wetted zeolites used in treating mineral oils by the process of this invention are regenerated simply by contact with saturated aqueous sodium chloride and may be used for treating oils and then regenerated repeatedly. This is illustrated in the following example:

*Example IV*

A fresh portion of the same zeolite used in Example III was converted to the magnesium zeolite by treating with an excess of magnesium sulfate solution and was then wet thoroughly with crude oil. This exhausted, oil wetted zeolite was then regenerated by simply washing with a saturated water solution of sodium chloride. Excess sodium chloride was removed from the treated zeolite by washing it with distilled water. Another portion of the same West Texas crude used in Example III was passed through this regenerated zeolite and the treated oil was found to contain 17.4 lbs. of hydrolyzable chloride per barrel, indicating a reduction of 23.3% in chloride content.

It is offered in explanation of the results observed in the above examples that the following typical reactions take place in the treatment of oils containing magnesium and calcium salts with sodium zeolites.

$$2NaH_6AlSiO_7 + MgCl_2 = Mg(H_6AlSiO_7)_2 + 2NaCl$$
$$2NaH_6AlSiO_7 + CaCl_2 = Ca(H_6AlSiO_7)_2 + 2NaCl$$
$$2NaH_6AlSiO_7 + MgSO_4 = Mg(H_6AlSiO_7)_2 + Na_2SO_4$$

Similar reactions occur with other hydrated alkali aluminum silicates of the zeolite type.

When the zeolite has become exhausted it is regenerated by passing a concentrated solution of common salt through the material. The regeneration treatment may be aided by first passing naphtha through the zeolite bed or by steaming it in order to remove oil, although this is not generally necessary. The typical reactions of the regeneration are:

$$Ca(H_6AlSiO_7)_2 + 2NaCl = 2NaH_6AlSiO_7 + CaCl_2$$
$$Mg(H_6AlSiO_7)_2 + 2NaCl = 2NaH_6AlSiO_7 + MgCl_2$$

The magnesium and calcium salts are thus discarded to waste, the original content of these materials in the oil being replaced by sodium. The sodium salts are not corrosive to refinery equipment, whereas the salts that have been replaced are corrosive.

This invention is not to be limited to any specific examples or theoretical explanations presented herein, all such being intended solely for purpose of illustration, as it is desired to claim all novelty inherent in this invention in so far as the prior art permits.

I claim:

1. Process for reducing the corrosive action of substantially unemulsified crude mineral oils containing hydrolyzable inorganic salts of alkaline earth metals, comprising contacting said coils with a fixed bed of sodium zeolite.

2. Process for reducing the corrosive action of substantially unemulsified crude mineral oils containing halides of alkaline earth metals, comprising percolating said oils through a fixed bed of sodium zeolite.

3. Process for removing magnesium chloride from substantially unemulsified crude mineral oil containing it, comprising percolating said oil through a fixed bed consisting of lumps of an alkali metal zeolite.

4. Process for removing magnesium chloride from a crude mineral oil containing it, comprising contacting said oil with a fixed bed of sodium zeolite, removing the treated oil from contact with the zeolite, then regenerating the zeolite by contact with aqueous sodium chloride and using the regenerated zeolite for further treatment of additional mineral oil.

5. Continuous process for reducing the corrosive activity of hydrolyzable salts in a non-emulsified petroleum oil which comprises passing said oil through a bed of alkali zeolite, separating the partially spent zeolite material, regenerating the zeolite material by treating with an aqueous solution of an alkali halide and reincorporating the thus regenerated zeolite material in the initial treating system.

6. Process for reducing the corrosive action of a substantially unemulsified crude mineral oil containing hydrolyzable salts which comprises contacting said oil with an alkali metal zeolite in such a manner that the said zeolite is not dispersed in the oil.

7. Process for reducing the corrosive action of a substantially unemulsified crude mineral oil containing hydrolyzable salts which comprises contacting said oil with a fixed bed of an alkali metal zeolite.

8. Process for reducing the corrosive action of a substantially unemulsified crude mineral oil containing hydrolyzable salts which comprises percolation said oil through a bed consisting of lumps of an alkali metal zeolite.

MINOR C. K. JONES.